United States Patent [19]

Kobak

[11] 4,413,932
[45] Nov. 8, 1983

[54] PNEUMATIC CONVEYORS FOR FLOW OF GAS-BORNE PARTICULATE MATERIAL

[75] Inventor: Joseph Kobak, Wallsend, Australia

[73] Assignee: The Broken Hill Proprietary Company Limited, Melbourne, Australia

[21] Appl. No.: 349,197

[22] Filed: Feb. 17, 1982

Related U.S. Application Data

[63] Continuation-in-part of Ser. No. 221,790, Dec. 31, 1980, abandoned, which is a continuation-in-part of Ser. No. 58,262, Jul. 17, 1979, abandoned.

[30] Foreign Application Priority Data

Aug. 8, 1978 [AU] Australia .............................. PD5419

[51] Int. Cl.³ ............................................. B65G 53/16
[52] U.S. Cl. ..................................... 406/138; 406/93; 406/142; 406/193; 406/194
[58] Field of Search .................... 406/93, 94, 138, 141, 406/142, 153, 193, 194; 137/13

[56] References Cited

U.S. PATENT DOCUMENTS

| | | | |
|---|---|---|---|
| 1,082,113 | 12/1913 | Diden | 406/194 X |
| 1,328,750 | 1/1920 | Meider | 406/93 |
| 1,614,770 | 1/1927 | Ayling | 406/193 |
| 2,989,349 | 6/1961 | Hartley | 406/142 |
| 3,206,255 | 9/1965 | Gray | 406/93 |
| 3,708,207 | 1/1973 | Steele . | |
| 3,826,279 | 7/1974 | Verschuur | 137/13 X |
| 4,097,092 | 6/1978 | Lapple | 406/93 |

FOREIGN PATENT DOCUMENTS

| | | |
|---|---|---|
| 151932 | 7/1952 | Australia . |
| 166013 | 3/1954 | Australia . |
| 163314 | 7/1954 | Australia . |
| 438143 | 1/1970 | Australia . |
| 20118 | 3/1972 | Australia . |
| 48048 | 4/1974 | Australia . |
| 491486 | 12/1976 | Australia . |
| 501645 | 8/1977 | Australia . |
| 493728 | 5/1978 | Australia . |
| 968011 | 5/1975 | Canada . |
| 489536 | 1/1954 | Italy ................................. 406/194 |
| 319278 | 10/1930 | United Kingdom . |
| 724292 | 2/1955 | United Kingdom . |

Primary Examiner—Jeffrey V. Nase
Attorney, Agent, or Firm—Murray and Whisenhunt

[57] ABSTRACT

A method and apparatus for transporting gas-borne particulate material comprising a pneumatic conveyor having an elongate duct. In order to inhibit formation of stagnant pockets and recirculation of solids within the duct, an annular flow of gas is introduced into the duct, preferably along its peripheral wall. The annular flow is auxiliary to the main flow and may be introduced via an annular passage encompassing an inlet section of the duct and extending longitudinally of the duct. Gas may be supplied to the annular passage from an annular plenum chamber surrounding the duct.

18 Claims, 6 Drawing Figures

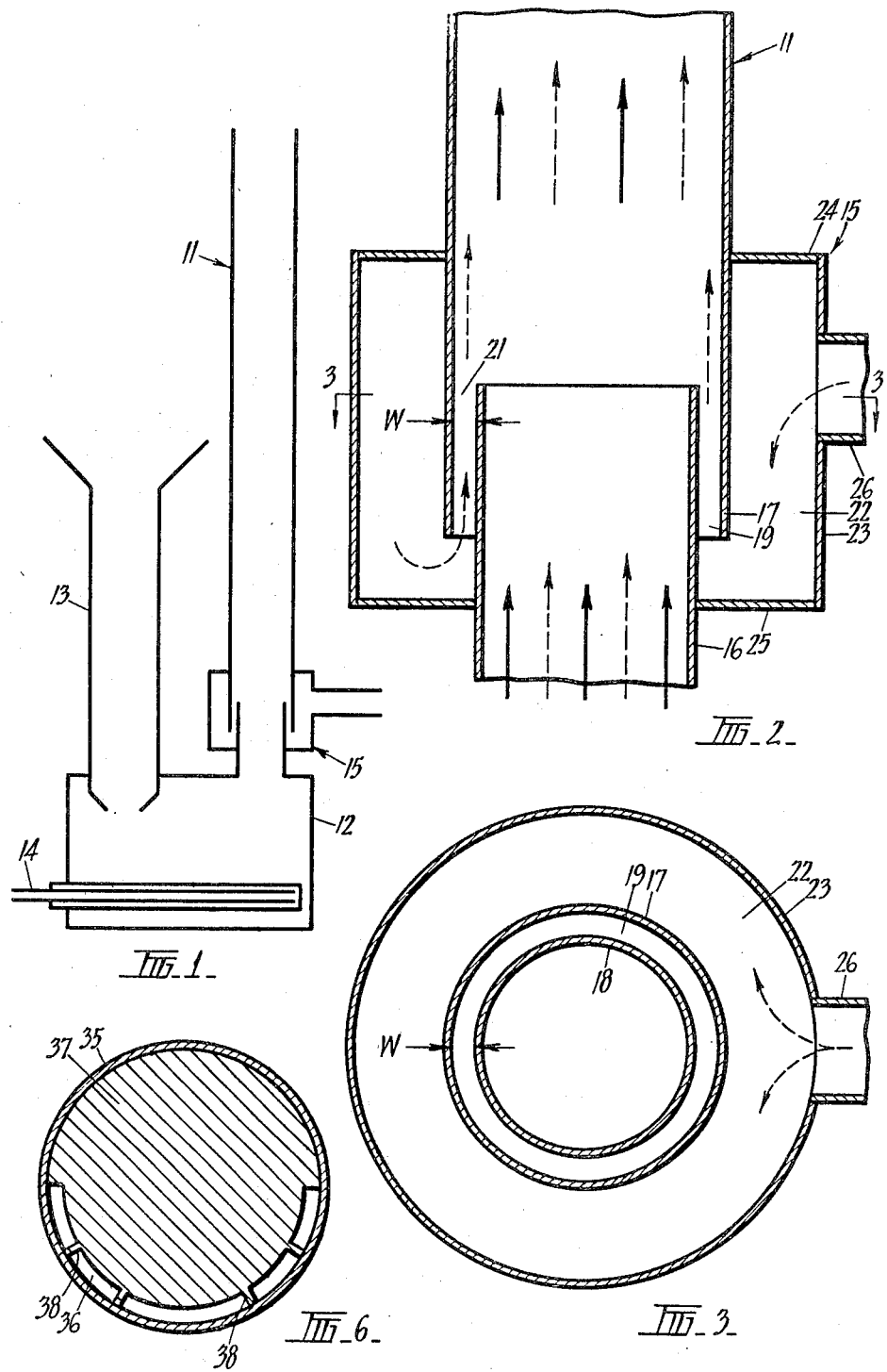

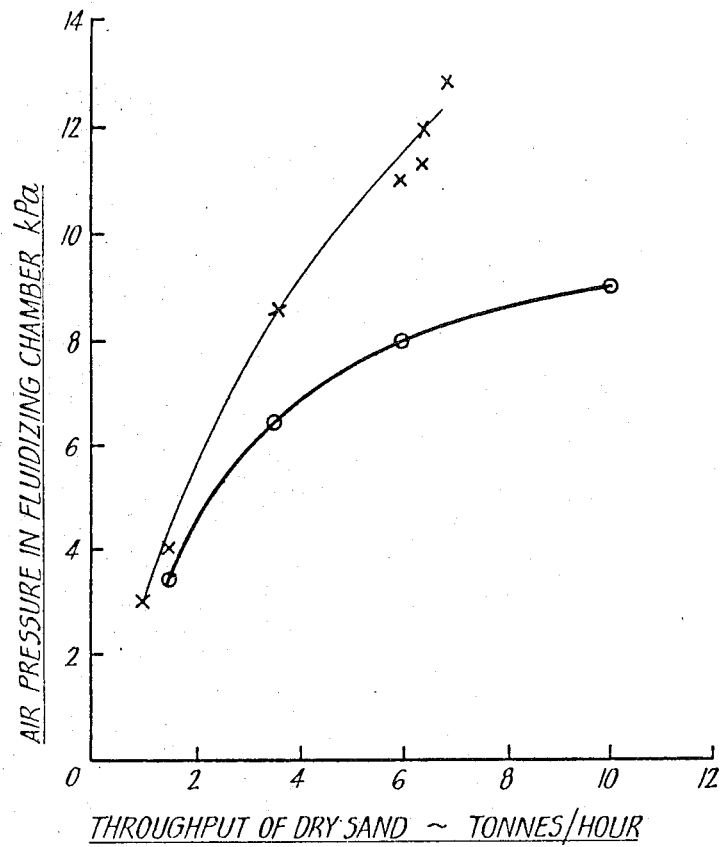
_Fig. 4_
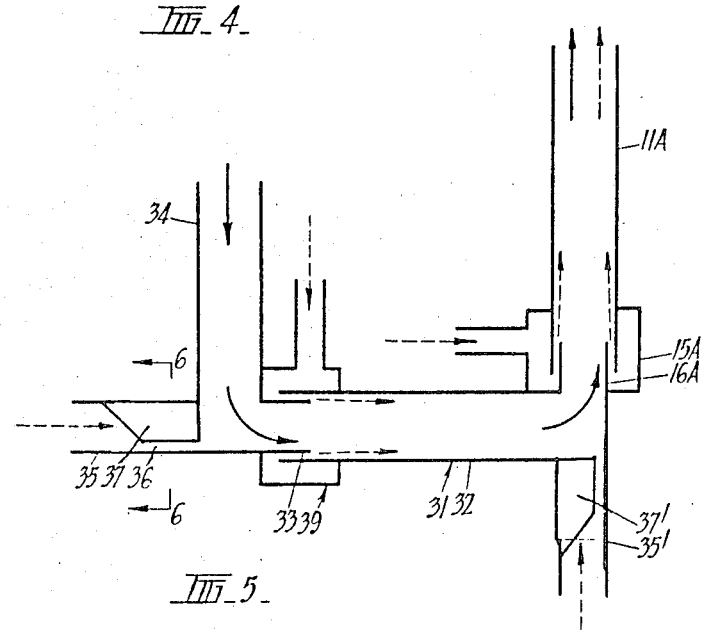
_Fig. 5_

4,413,932

PNEUMATIC CONVEYORS FOR FLOW OF GAS-BORNE PARTICULATE MATERIAL

CROSS REFERENCE TO RELATED APPLICATIONS

This application is a continuation-in-part of Serial No. 221,790, filed Dec. 31, 1980, now abandoned, which is a continuation-in-part of Ser. No. 58,262, filed July 17, 1979, now abandoned.

BACKGROUND OF THE INVENTION

This invention relates to a method of transporting particulate material and to pneumatic conveyors used for transporting particulate material by means of a gas.

As used in this specification the term "gas" includes air or other gases and also extends to vapours, for example steam of L.P.G. Similarly, the term "pneumatic" is to be understood as extending to the use of vapours as well as gases.

It has been found in practice that when transporting powdered or granular solids in a pneumatic conveyor, some of the solids near the side walls of the conveying duct or column tend to become detached from the main stream to form stagnant pockets or, if the material is being transported upwardly, to slide back downwardly along the walls of the conveying column. Recirculation of solids along side walls is particularly severe where the particulate material enters an upright conveying column, and may range over a distance equivalent to several diameters of the conveying column from entry. The occurrence of stagnant pockets or recirculation is detrimental to the performance and operation of pneumatic conveyors.

Recirculation at the entry of a conveying column is particularly wasteful of energy because some clusters of particles that enter the conveying column return downwards and require additional energy to accelerate them to the transport velocity. The recirculation promotes uneven transfer of solids, and thus higher conveying gas velocities are required to establish a safety margin against formation of relatively high density slugs of dispersed particles in the conveying column. Such slugs exert a back pressure which communicates towards the entry to the column, causing more recirculation and nonuniform entry of particles into the column. Thus, the effect is cumulative and may lead to instability in the conveyor.

This undesirable effect is mainly due to the way in which the particulate material enters the conveying column. The feed of solids is inherently non-uniform and the particles enter the conveying column in clusters. This occurs both with mechanically assisted feeders and in gravity fed pneumatic systems. The effect is worsened by the distribution of velocities in the conveying column, where the velocity of the conveying fluid is lowest at the walls of the column.

The force, and thus the gas velocity required to accelerate the particles and to maintain them at the transport velocity, is greater for clusters then it is for uniformly dispersed particles. Furthermore, if such a cluster moves towards the walls of the conveying column, it reaches a zone of lower gas and particle velocities. In collision with the wall or other clusters, which may already by moving downwards, it loses momentum and may merge to form a bigger cluster, which will require still higher acceleration for transport. Further, the particles touching the walls can form a layer on the walls. Such a layer, which can be several particles deep, will act as a rough lining of the walls and will be outside the influence of the gas velocities. It will move downwards under the action of gravity. Additionally, if the material is difficult to fluidise, is wet, or is moist, it has a tendency to stick to the walls.

Attempts have been made to eliminate or reduce the formation of clusters.

These have included:
(a) increasing the total amount of gas.
(b) installing a secondary pipe at the entry to the conveying column to introduce additional gas.

These techniques have not proved very satisfactory for one or more of the following reasons:
1. Increasing the velocity of gas in the column does not materially affect the situation at the walls where it is required, and recirculation and adherence to the walls can persist at very high velocities.
2. The increase in flow-rate increases the pressure in the conveyor and increases the pressure drop along the conveying column.
3. At very high velocities, there is a tendency for abrasion and breakage with some materials.
4. The presence of a secondary pipe projecting into the column causes interference to the flow of gas and particles.
5. The secondary pipe is subject to abrasive wear by the moving solids.

SUMMARY OF THE INVENTION

The present invention provides an improved method and apparatus which enables stagnation layers and recirculation to be substantially eliminated while avoiding the above problems.

According to the invention there is provided pneumatic transport apparatus for transporting particulate material, comprising an elongate duct for flow of gas-borne particulate material in a flow direction and auxiliary gas inlet means to deliver an annular flow of gas along at least part of the periphery of the duct in said flow direction.

The term "annular" as used herein is understood to embrace a part annulus or arc.

The gas inlet means may be disposed at or near an inlet end of the duct and there may be means to introduce a main flow of gas bearing the particulate material into the inlet end of the duct, the annular flow of gas introduced by the gas inlet means being auxiliary to the main flow.

More particularly, the inlet end of the duct may comprise a duct inlet section of smaller flow cross-section than that of the duct downstream from said gas inlet means and the gas inlet means may comprise an annular passage encompassing the inlet section of the duct.

The duct wall which defines the duct downstream from the gas inlet means may overlap a downstream end portion of said duct inlet section and said annular passage may be defined by a gap between the overlapping duct wall and said downstream end portion of the duct inlet section.

Preferably, the length of the annular passage in the direction of the gas flow is no less than four times the width of that passage.

The duct and the annular passage may be generally cylindrically curved.

The gas inlet means may further comprise a plenum chamber communicating with the upstream end of the annular passageway and a plenum chamber inlet for supply of gas into the plenum chamber and thence through the annular passageway into the duct. The plenum chamber may be an annular chamber encompassing the duct.

The duct may be upright such that the gas flow direction is upwards and the lower or upstream end of the inlet section may be connected to a feed device for introducing the particulate material. More particularly, the apparatus may comprise a fluidizing chamber connected to the lower end of the inlet section, means to feed particulate material into the fluidizing chamber and means to supply gas under pressure into the fluidizing chamber so as to entrain the particulate material and to carry it upwardly through the duct inlet section and upwardly into the duct downstream from said gas inlet means.

The duct may be horizontal or inclined and it may change its direction if so desired to vertical and again to horizontal or inclined by means of sharp bends, the said bends incorporating the said gas inlet means. Furthermore, the horizontal or inclined duct can be so disposed that it will accept moist or wet granular material, or material which is not fluidized.

BRIEF DESCRIPTION OF THE DRAWINGS

In order that the invention may be more fully explained some particular embodiments will be described in some detail with reference to the accompanying drawings, in which:-

FIG. 1 is a diagrammatic vertical cross-section through a gravity fed pneumatic conveyor incorporating an apparatus constructed in accordance with the present invention;

FIG. 2 is a vertical cross-section to an enlarged scale through part of the conveyor;

FIG. 3 is a horizontal cross-section on the line 3—3 in FIG. 2;

FIG. 4 is a graph illustrating comparative performance of a pneumatic conveyor with and without an annular gas distributor;

FIG. 5 illustrates an arrangement for pneumatically conveying moist or wet sand; and FIG. 6 illustrates the cross-sections on the lines 6—6 in FIG. 5.

DESCRIPTION OF THE PREFERRED EMBODIMENTS

The illustrated conveyor provided comprises a conveyor duct 11 extending vertically from a fluidizing chamber 12. Particulate material is fed under gravity into fluidizing chamber 12 via a feed pipe 13 and conveying gas is supplied to the fluidizing chamber via distributors 14. The conveying gas which enters chamber 12 fluidizes the particulate material in the chamber and flows upwardly through column 11 carrying with it the entrained particulate material.

In accordance with the present invention the lower or inlet end of duct 11 is provided with gas inlet means denoted generally as 15 to deliver an annular flow of auxiliary gas into duct 11 in the (upward) flow direction.

As most clearly seen in FIGS. 2 and 3 the inlet end of duct 11 comprises a cylindrical duct inlet section 16 of smaller diameter than the diameter of the main part of duct 11 downstream (upwardly) from gas inlet means 15. The lower end portion 17 of the wall of the main, larger diameter, part of duct 11 overlaps an upper (downstream) end portion 18 of duct inlet section 16 and the gas between the overlapping walls defines an annular passageway 19 through which auxiliary gas is directed to the main part of the duct via the annular outlet 21 at the outer end of passageway 19. The lower end of annular passageway 19 communicates with an annular plenum chamber 22 formed by a cylindrical casing 23 which surrounds the duct. The upper end wall 24 of the plenum chamber casing is sealed to the main part of duct 11 and the lower end wall 25 of the casing is sealed to the duct inlet section 16. The casing is provided with a tubular gas inlet 26 through which the auxiliary gas is passed into plenum chamber 22 whence it flows upwardly through annular passageway 19 and out through the annular outlet 21 into the main part of the duct. The auxiliary gas is thus delivered into the main part of the duct in an annular flow directed upwardly along the periphery of the duct.

It has been found that the introduction of auxiliary gas adjacent the inlet of the conveying duct by means of apparatus of the illustrated type greatly improves the performance of the conveyor. It is possible to achieve improved efficiency and throughput with lower gas flow rates and lower pressure drops in the conveying column. Recirculation is substantially eliminated and the conveyor is inherently stable in operation.

FIG. 4 illustrates the actual pressures and throughputs of the same pneumatic conveyor when used with and without the annular device. Further, the same pneumatic conveyor having an air pressure of 13 kPa in the fluidizing chamber, will transport 6.8 tonnes per hour of a certain sand without the annular device, but will transport 8.8 tonnes per hour of the same sand when operated with the device. In both cases the total amount of supplied air is the same at 536 kg per hour.

Because of the improved stability and the ability to supply any amount of auxiliary gas for conveying there is much more flexibility with regard to the size and geometry of the gravity feeder, which can be designed for the sole purpose of feeding under optimum conditions. Moreover, the range of pneumatic conveying is extended into the region of very fine powders, such as cement, at low pressures.

A conveying column incorporating an annular gas distributor in accordance with the invention can be of any suitable cross-sectional shape and the walls do not have to be parallel. The annular distributor may be disposed concentrically or eccentrically within the column and the dimensions of the annular gas inlet passage can be varied within wide limits to satisfy the velocity requirements of the column, the proportion of the conveying gas being replaced by the auxiliary gas and the pressure drop across the annular passage, although for best results it is preferred that the length of the annular passage be no less than four times its width (indicated as W in FIGS. 2 and 3).

For operation in certain applications inclined fins or vanes can be fitted in the annular gas inlet passageway to impart a swirling or tangential component to the longitudinal velocity of the gas.

It is not essential that the duct incorporating gas inlet means in accordance with the invention be connected to a fluidizing chamber and other techniques for feeding the particulate material, for example a screw feeder, can be used.

FIGS. 5 and 6 illustrate an arrangement for pneumatically transporting wet or moist solids such as sand. In this arrangement, the vertical conveyor duct 11A, the auxiliary gas inlet means 15A and the conveyor duct inlet section 16A are much the same as the equivalent components 11, 15 and 16 of the embodiment illustrated in FIGS. 1 to 3. In this case, however, the fluidizing feed apparatus is replaced by a feed device denoted generally as 31 for handling moist solids.

Feed device 31 comprises a horizontal feed duct 32 connected at one end to the lower end of the conveyor duct inlet section 16A and receiving at its other end a feed duct inlet section 33 which receives moist solids through a vertical standpipe 34.

Pressurised gas is introduced into the feed duct inlet section 33 from a gas inlet pipe 35 via an annular gap 36 formed by a circumferentially notched disc 37 fitted within the inlet pipe at its connection with the inlet section 33. The circumferential notch in disc 37 extends around only half the circumference of the disc so that the annular gas flow delivered through this gap is concentrated around the lower part of the periphery of the duct inlet section to prevent the moist solids from adhering to the wall of the inlet section in the region where there is a change in flow direction. As indicated in FIG. 6, the annular gaps 36 may be divided by longitudinally extending vanes 38.

An auxiliary gas distributor 39 is provided to introduce an annular flow of auxiliary gas into the longitudinal feed duct 32 at the downstream end of the inlet section 33 in much the same manner the distributor 15A introduces gas into the conveyor duct 11A. A further gas inlet pipe 35' and notched disc 37' are also provided to produce an annular flow of gas along the outer part of the periphery of the conveyor duct inlet section 16A where the feed direction changes from horizontal to vertical.

In other arrangements, an annular gas distributor could be fitted to an inclined or horizontal duct.

The method and apparatus described above can be used to pneumatically transport a wide range of materials and powders. In various tests that have been carried out to develop the invention, the following list of materials have been conveyed with the use of an auxiliary annular gas supply:

alumina, barytes, cement, cotton trash, kaolin, magnesite, milled clay, phosphate rock, pulverized coal, pyrobor, pyrophyllite, sand, soda ash, sugar, zircon flour.

With reference to FIG. 2, the cross-sectional area of the annular passageway 19 is arranged to be between 8% and 25% of the area of the duct 11. The dimensions vary with the requirements of gas velocity at the walls and the quantity of the auxiliary gas to be added to the mainstream of gas flowing through the fluidized chamber 12. It is important that the gas velocity in the annular passageway 19 and in particular the annular outlet 21 into the main part of the duct, is always higher than the free-falling velocity of the largest particle of the conveyed material. In practice, the gas velocity at the annular outlet 21 is within the range of 12 to 50 meters per second. The main gas flow with the entrained particulate material is between 8 and 20 meters per second. To ensure against re-circulation of the particulate material, it has been found that the auxiliary gas supply should define an annular stream of gas that extends from the outlet 21 of the annular passageway to a height of at least three times the width of the annular passage 19.

Within the limits of the above parameters, conveying ducts were used having diameters from 6 mm to 200 mm, though larger ducts can be used if very large transport rates are required. As an illustrative example, a 150 mm diameter duct is capable of transporting 30 tonnes per hour of particulate material with a pressure drop in the duct of 0.25 kPa (1"WG) per meter of vertical lift. The pressure drop across the annular passageway is usually designed to be between 2 and 6 kPa.

A further advantage of the method and apparatus described above is that when the main gas in the fluidizing chamber is turned off, no more material is transferred into the conveying duct. It is possible not only to turn the conveyor on and off at will, but the continuing flow of the auxiliary annular gas clears the conveying duct of any solids, after the fluidization ceases.

As shown on the left-hand side of FIG. 5, the apparatus may also be used to ensure efficient flow of fluid along a duct that has to turn through 90°. The apex of the corner is frequently a stagnant pocket into which the particulate material collects to reduce the efficiency of the conveyor. The use of the annular gap 36 and auxiliary passage of gas past this gap forms a high velocity layer of the gas adjacent the lower half of the duct, thereby preventing the particles from reaching the walls and in particular the apex of the corner. In one example, the annular gap 36 has a preferred width of between 3 to 5 mm thereby causing a local high velocity layer, maintained for example, at between 60 to 100 meters per second.

The apparatus of the present invention is for the transfer of dilute or lean phase mixtures in contrast to other material transfer apparatus concerned with the conveyance of dense or high bulk density mixtures. In general terms, high bulk density mixtures are those where the mass ratio of solid to gas is in the hundreds. Lean mixtures have a ratio in the tens or less. Often the dividing line is taken at eighty. In alternative forms, the dividing line is at a voidage of about 0.1 or a density of about 0.1 gm/cm$^3$. The apparatus of the present invention is for particular use with mixtures having a mass ratio of between 15:1 to 30:1 depending on size and particle density and operating pressures.

A significant feature of the method of operation of the pneumatic conveyor described above concerns the ability of the apparatus to operate at comparatively low pressures, i.e. 10–15 kPa. The use of low pressures does away with the necessity of high quality seals and reduces damage to the ducts, particularly at the bends. The auxiliary annular flow at the inlet of the duct is maintained continuously during use of the apparatus to effectively prevent recirculation and clogging of the particulate material at the wall or walls of the duct. The auxiliary gas flow acts not as a booster to encourage and accelerate flow but as a fluid barrier preventing the formation of clusters and clogging at the walls of the duct.

I claim:

1. A method of transporting particulate material, said method comprising:
   (a) entraining said particulate material in a lean phase with a main flow of gas;
   (b) delivering said main flow of gas along an elongate duct at a low pressure via a duct inlet of said duct;
   (c) introducing an auxiliary gas stream at a low pressure into said elongate duct adjacent to said duct inlet to define a low pressure non-boosting annular stream of auxiliary gas directed along at least part of a periphery of said duct;

said particulate material being transported along said duct entrained in lean phase by said main flow of gas;

said annular stream of auxiliary gas at least substantially preventing collection and recirculation of particulate material without boosting blow of said particulate material along said elongate duct.

2. The method according to claim 1 comprising entraining said particulate material in a main flow of gas flowing at between 8 to 20 meters per second.

3. The method according to claim 1 comprising controlling said auxiliary gas stream to enter said duct at between 20 to 50 meters per second.

4. The method according to claim 1 comprising forming said annular stream of auxiliary gas by passing said auxiliary gas stream through an annular passage defined between a feed duct from a fluidizing chamber and said duct inlet, said feed duct terminating within said duct inlet to define said annular passage.

5. The method according to claim 4 comprising arranging said elongate duct upright and causing said annular stream of auxiliary gas to extend up said at least part of said periphery of said duct to a height of substantially three times the width of the annular passage measured from termination of the feed duct.

6. The method according to claim 1 further comprising introducing a second auxiliary gas stream into said duct adjacent any duct sharp bend which is prone to material deposition to define an arcuate layer of gas extending along the periphery of the duct which is located on the outside of the duct sharp bend.

7. The method according to claim 1, wherein flow of said auxiliary gas stream is maintained continuously at said duct inlet.

8. A method of transporting articulate material, said method comprising:
(a) entraining said particulate material in a lean phase with a main flow of gas in a fluidizing chamber having a feed duct;
(b) delivering said particulate material borne by said main flow of gas along an elongate duct at a low pressure via a duct inlet of said duct;
(c) introducing an auxiliary gas stream at a low pressure into said elongate duct adjacent said duct inlet to define a low pressure non-boosting annular stream of auxiliary gas directed along at least part of a periphery of said duct, said annular stream of auxiliary gas being formed by passing said auxiliary gas stream through an annular passage defined between a feed duct from said fluidizing chamber and said duct inlet, said feed duct terminating within said duct inlet to define said annular passage;

said particulate material being transported along said duct entrained in lean phase by said main flow of gas;

said annular stream of auxiliary gas at least substantially preventing collection and recirculation of particulate material without boosting flow of said particulate material along said elongate duct.

9. A method of transporting particulate material, said method comprising:
(a) entraining said particulate material in a lean phase with a main flow of gas;
(b) delivering said main flow of gas along an elongate duct at a low pressure via a duct inlet of said duct, said particulate material being transported along said duct entrained in lean phase by said main flow of gas;
(c) at least substantially preventing collection and recirculation of particulate material without boosting flow of said particulate material along said elongate duct by introducing a first auxiliary gas stream at a low pressure into said elongate duct adjacent said duct inlet to define a low pressure non-boosting annular stream of auxiliary gas directed along at least part of a periphery of said duct, and introducing a second auxiliary gas stream at a low pressure into said elongate duct adjacent any duct sharp bend which is prone to material deposition to define a second low pressure non-boosting annular stream of auxiliary gas extending along only a periphery of said elongate duct which is located on the outside of the duct sharp bend.

10. Pneumatic transport apparatus for transporting particulate material, said apparatus comprising:
(a) elongate duct means for directing flow of gas-borne particulate material in a flow direction, said elongate duct means having a duct inlet means;
(b) feed means having a feed outlet means connected to said duct inlet means for entraining particulate material in a lean phase with a main flow of gas and delivering said main flow of gas at a low pressure to said duct inlet means, said feed outlet means being of smaller cross-section than said duct inlet means and extending into said duct inlet means to define an annular passage between an end portion of said duct inlet means and said feed outlet means;
(c) auxiliary gas inlet means for supplying auxiliary gas at a low pressure into said annular passage to form a low pressure non-boosting annular stream of auxiliary gas directed along at least part of a periphery of said elongate duct means, said annular stream of auxiliary gas at least substantially preventing collection and recirculation of particulate material without boosting flow of said particulate material along said elongate duct means.

11. Pneumatic transport apparatus according to claim 10 wherein said annular passage has a cross-section between 8 and 25% of a cross-section of said duct means inlet.

12. Pneumatic transport apparatus according to claim 10 wherein said annular passage has a length in said flow direction of no less than four times a width of said passage.

13. Pneumatic transport apparatus according to claim 10 wherein said auxiliary gas inlet means for supplying auxiliary gas comprises a plenum chamber communicating with said annular passage and a plenum chamber inlet for supply of gas into said plenum chamber and then through said annular passage into said elongate duct means.

14. Pneumatic transport apparatus according to claim 13 wherein said plenum chamber is an annular chamber encompassing said elongate duct means.

15. Pneumatic transport apparatus according to claim 10 wherein said elongate duct means is generally upright such that said flow of gas is generally upwards.

16. Pneumatic transport apparatus according to claim 10 wherein a further auxiliary gas inlet means is provided at each duct means sharp bend prone to particulate material deposition for preventing particulate material deposition on said periphery of said elongate duct means by delivering an arcuate layer of gas along only an outer wall of the periphery of the duct means sharp bend.

17. Pneumatic transport apparatus according to claim 16 wherein said further auxiliary gas inlet means comprises a disc means extending across the duct means for defining an arcuate gap therebetween for forming on the outer wall of the periphery of the duct means sharp bend an arcuate layer of further auxiliary gas by passage of the further auxiliary gas through the gap.

18. Pneumatic transport apparatus for transporting particulate material, said apparatus comprising:
 (a) elongate duct means for directing flow of gas-borne particulate material in a flow direction, said duct means having a duct inlet means;
 (b) feed means having a feed outlet means connected to said duct inlet means for entraining particulate material in a lean phase with a main flow of gas and delivering said main flow of gas at a low pressure to said duct inlet means, said feed outlet means being of smaller cross-section than said duct inlet means and extending into said duct inlet means to define an annular passage between an end portion of said duct inlet means and said feed outlet means;
 (c) first auxiliary gas inlet means for supplying auxiliary gas at a low pressure into said annular passage to form a low pressure non-boosting annular stream of auxiliary gas directed along at least part of a periphery of said elongate duct means, said annular stream of auxiliary gas at least substantially preventing collection and recirculation of particulate material without boosting flow of said particulate material along said elongate duct means;
 (d) second auxiliary gas inlet means, at each duct means sharp bend prone to particulate material deposition, for supplying a low pressure non-boosting annular flow of gas along only a part of a wall of said duct means located on the outside of said duct means sharp bend, said annular flow of gas at least substantially preventing collection and recirculation of particulate material without boosting flow of said particulate material at each said duct means sharp bend.

* * * * *